United States Patent [19]
Nojima et al.

[11] Patent Number: 5,764,139
[45] Date of Patent: Jun. 9, 1998

[54] INFORMATION DISPLAY APPARATUS FOR VEHICLES

[75] Inventors: Akihiko Nojima; Takashi Yanagisawa, both of Toyota, Japan

[73] Assignee: Toyota Jidosha Kabushiki Kaisha, Toyota, Japan

[21] Appl. No.: 735,111

[22] Filed: Oct. 22, 1996

[30] Foreign Application Priority Data

Nov. 6, 1995 [JP] Japan .................... 7-286915

[51] Int. Cl.$^6$ .................................... B60Q 1/00
[52] U.S. Cl. .................. 340/461; 340/438; 340/439; 364/424.034; 364/423.098
[58] Field of Search ................. 340/438, 439, 340/441, 449, 450, 451, 453, 459, 461, 577, 523, 525; 364/424.034, 423.098

[56] References Cited

U.S. PATENT DOCUMENTS

| 5,121,112 | 6/1992 | Nakadozono | 340/870.16 |
| 5,327,117 | 7/1994 | Kohsaka | 340/525 |
| 5,414,645 | 5/1995 | Hirana | 364/551.01 |
| 5,483,446 | 1/1996 | Momose et al. | 364/423.098 |
| 5,590,040 | 12/1996 | Abe et al. | 364/424.034 |

FOREIGN PATENT DOCUMENTS

| 314 642 | 5/1989 | European Pat. Off. . |
| 672 892 | 9/1995 | European Pat. Off. . |
| 4140864 | 6/1992 | Germany . |
| 5-238313 | 9/1993 | Japan . |
| 6-255396 | 9/1994 | Japan . |
| 6-86198 | 12/1994 | Japan . |
| 7-5817 | 1/1995 | Japan . |

*Primary Examiner*—Jeffery Hofsass
*Assistant Examiner*—Daryl C. Pope
*Attorney, Agent, or Firm*—Cushman, Darby & Cushman IP Group of Pillsbury, Madison & Sutro LLP

[57] ABSTRACT

An information display apparatus for vehicles for securely providing the driver with only information corresponding to the running condition, the information display apparatus comprising an information processor for receiving information detected by various sensors and monitors and for detecting the running condition of the vehicle, memory containing information on respective running conditions for display and degree of information importance being, and a display unit for displaying information in a display area or in an amount according to the degree of importance. The memory of the information display apparatus is used to read information corresponding to the detected running condition and the degree of information importance. The display area of speed information is increased when the vehicle is running straight and the display area of information about conditions behind the vehicle is increased when the vehicle is traveling in reverse.

16 Claims, 12 Drawing Sheets

| RUNNING CONDITION | ITEM OF INFORMATION | ALLOWABLE AMOUNT OF INFORMATION | ORDER OF PRIORITY | RATIO |
|---|---|---|---|---|
| GET IN AND INSERT KEY INTO IGNITION | DIAGNOSIS<br>WARNING<br>SHIFT<br>FUEL<br>TEMP | 100% | 1<br>2<br>3<br>4<br>5 | 20%<br>20%<br>20%<br>20%<br>20% |
| SHIFT LEVER IN R | BACK MONITOR<br>SHIFT<br>FUEL<br>TEMP | 20% | 1<br>2<br>3<br>4 | 60%<br>20%<br>10%<br>10% |
| WHEN ROUTE GUIDE IS DISPLAYED, CAR GOES STRAIGHT. | ARROW GUIDE<br>SPEED<br>FUEL<br>TEMP | 40% | 1<br>2<br>3<br>4 | 30%<br>50%<br>10%<br>10% |
| WHEN ROUTE GUIDE IS DISPLAYED, CAR IS 700M BEFORE INTERSECTION. | CROSSING GUIDE<br>SPEED<br>FUEL<br>TEMP | 40% | 1<br>2<br>3<br>4 | 40%<br>40%<br>10%<br>10% |
| WHEN ROUTE GUIDE IS DISPLAYED, CAR IS 300M BEFORE INTERSECTION. | CROSSING GUIDE<br>SPEED<br>FUEL<br>TEMP | 40% | 1<br>2<br>3<br>4 | 50%<br>30%<br>10%<br>10% |
| AT INTERSECTION WHERE DRIVER CANNOT GET A CLEAR VIEW | CORNER MONITOR<br>ARROW GUIDE<br>FUEL<br>TEMP | 40% | 1<br>2<br>3<br>4 | 60%<br>20%<br>10%<br>10% |
| WHILE GOING STRAIGHT, PRECAUTION IS GIVEN ON A PEDESTRIAN ABOUT TO CROSS | PRECAUTION<br>SPEED<br>FUEL<br>TEMP | 20% | 1<br>2<br>3<br>4 | 50%<br>30%<br>10%<br>10% |
| CAR GOES STRAIGHT ON A HIGHWAY | SPEED<br>AMBIENT CONDITION<br>FUEL<br>TEMP | 40% | 1<br>2<br>3<br>4 | 40%<br>40%<br>10%<br>10% |

Fig. 2

INFORMATION DISPLAY APPARATUS FOR VEHICLES

BACKGROUND OF THE INVENTION

1. Technical Field

The present invention relates to an information display apparatus for vehicles, and more particularly to a flexible display apparatus for displaying desired information in a desired form.

2. Prior Art

With the increasing functional sophistication of vehicles in recent years, it is helpful to display information necessary for operating the vehicle in a manner that the driver can see easily. Such a display enhances safety.

As an example of a display console is disclosed in Japanese Patent Laid-Open Publication No. Hei 7-5817, where information about various states is selectively shown in a three-partition display area on a flat image-receiving screen.

However, on the display console of the above prior art, different items of information are displayed uniformly because the display area is limited. As such, the display console of that prior art does not emphasize and deemphasize information that is important and timely to the vehicle operator.

More specifically, the kind of information the driver requires naturally differs based on the condition in which the vehicle is running, and even the degree of importance associated with one kind of information varies with the condition in which the vehicle is running. For example, while the vehicle may be running on a straight road, speed information is relatively important. But as the vehicle is approaching an intersection, information concerning whether the vehicle should turn left or right or information about the ambient condition becomes more important than speed information. As described, since the importance of information that the driver requires changes continuously (perhaps abruptly), the prior art consoles which employ a uniform pattern of display have been unable to aptly and securely provide the driver with information whose importance changes with the vehicle running conditions.

SUMMARY OF THE INVENTION

An object of the present invention is to provide a display apparatus which can aptly display information according to the running condition of a vehicle to securely and readily supply information truly necessary to the driver or the crew.

To achieve the above object, in one form of the invention, the information display apparatus for vehicles comprises detection means for detecting the running condition, memory means for storing information to display corresponding to respective running conditions and different degrees of importance of information, display means for displaying information, and control means for reading display information corresponding to the detected running condition as well as the degree of importance of the display information and displaying the display information in a display area according to its weighted degree of importance. The running conditions to be detected include, for example, a straight running condition, a backward running condition, a running condition just before an intersection, etc. In a backward running condition, information about the condition behind the vehicle has a relatively high importance, while in a straight running condition, speed information has a relatively high importance and just before an intersection information about turning left or right becomes relatively important. As described, since the importance of information differs with the running conditions, necessary information can be securely supplied to the driver if important information is displayed prominently.

In another form of the invention, the information display apparatus for vehicles comprises detection means for detecting the running condition, memory means for storing items of information to display corresponding to respective running conditions and different in degrees of importance of these items, display means for displaying information, and control means for reading the item of display information corresponding to the detected running condition and the degree of importance of the item of display information from the memory means and displaying the item of display information in the display means giving prominence according to the degree of importance. Only necessary information would be supplied to the driver in order to make effective use of the limited display by displaying a large amount of information related to the running condition and a small amount of information with a relatively low importance. The amount of information is set as follows. When the car is running straight, a larger amount of speed information is supplied. When the car is running in reverse, a larger amount of information about conditions behind the car is supplied. When the car is approaching an intersection, a larger amount of information about the intersection condition is supplied.

In yet another form of the invention, the information display apparatus for vehicles comprises detection means for detecting the running condition; memory means for storing items of information to display corresponding to respective running conditions, different degrees of importance of the items of information and an allowable total amount of information, display means for displaying information, and control means for reading the item of display information corresponding to the detected running condition, the degree of importance of the item of display information, and the allowable amount of information from the memory means and displaying the display information item in a display area according to its degree of importance within the allowable amount of information in the display means. In a running condition in which the driver must pay attention to the environment around the vehicle, a large amount of information should not be shown on the display. Therefore, by setting an allowable amount of information according to the running condition, the driver can be provided with only necessary information. A case where a large allowable amount of information can be set is, for example, when the vehicle is at a standstill. A case where a small allowable amount of information must be set is when the vehicle is going backward, for example.

BRIEF DESCRIPTION OF THE DRAWINGS

FIG. 2 is a table of data stored in the memory of the display apparatus shown in FIG. 1;

PREFERRED EMBODIMENTS OF THE PRESENT INVENTION

An embodiment of the present invention will be described with reference to the accompanying drawings.

Figure 1:
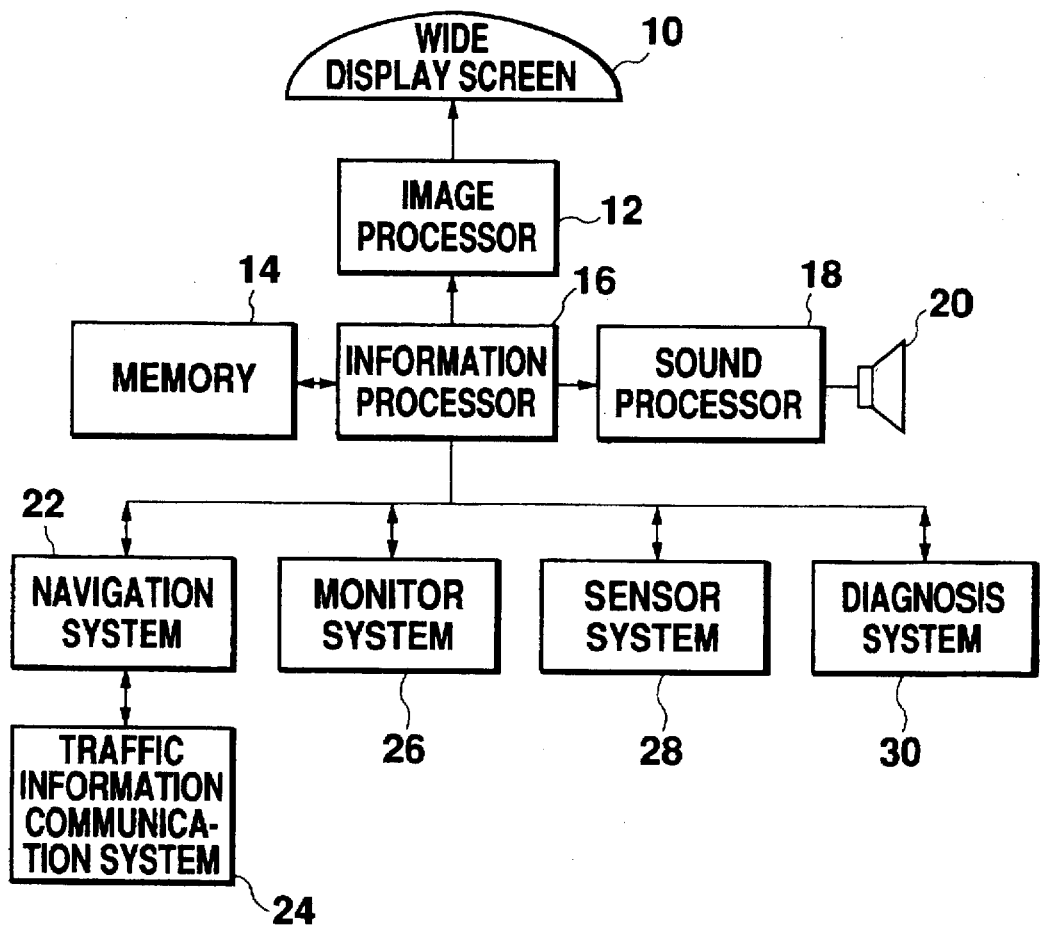
FIG. 1 is a block diagram of the display apparatus according to an embodiment of the present invention.

FIG. 1 is a block diagram of this embodiment. The instrument panel of the vehicle is formed by a wide display screen 10 (125 mm×700 mm), which is not a conventional fixed indicator. This display may be a liquid-crystal display or a CRT. The wide display 10 is connected through an image processor 12, probably including VRAMs, to an information processor 16 for editing information for display. The image processor 16 includes a CPU for specified arithmetic operations, a ROM containing a processing program to be described later, an I/O interface. The image processor 16 accesses a memory 14 containing information to display and decides which information to display, the size of display area, and the amount of information to display. The information to display in memory 14 includes, at least, the running condition and degrees of importance of information. The information processor 16 receives various information items from a navigation system 22, a traffic information communication system 24, a monitor system 26, a sensor system 28, and a diagnosis system 30; decides the running condition; and identifies and outputs necessary information to the image processor 12. Since some information should preferably be given in sound (an alarm, for example), the information processor 16 outputs such audio information from a speaker 20 using sound processor 18.

The navigation system 22 includes a position detecting system such as a GPS device, a map data memory such as a CD-ROM, and a route search system. When the route guide is used, the position of the vehicle and a recommended route, along with map data are supplied to the information processor 16. The traffic information communication system 24 includes communication means for radio-wave or optical two-way communications with information centers through beacons installed along the road, and obtains and supplies the road conditions including information about congestion or accidents to the information processor 16. The monitor system 26 includes monitors such as a back monitor for viewing the scene behind the vehicle, corner monitors for viewing the left and right sides, and an infrared monitor for picking up the scene in front of the vehicle. This monitor system supplies images to the information processor 16. The sensor system 28 detects the running speed or the engine rotating speed of the vehicle, fuel level, water temperature, shift position, rain, fog, etc. and supplies data to the information processor 16. The diagnosis system 30 monitors and reports conditions to the information processor 16.

Under the above arrangement, the information processor 16 decides information to display according to the running conditions, and displays information in a display area or in an amount of information according to the degree of information importance. The following processes will now be described, showing example running conditions.

FIG. 2 shows items of information for respective running conditions and degrees of their importance which are stored in the memory 14. The running conditions include:

(1) "The driver enters a vehicle and the key is inserted into the ignition switch."

(2) "The shift lever is fixed in R."

(3) "The car is running straight while the route guide is in operation."

(4) "The car is running at a point 700 m before an intersection."

(5) "The car is running at a point 300 m before an intersection."

(6) "The car is at an intersection where the driver cannot get a clear view ahead."

(7) "There is a possibility that a pedestrian will enter the road while the car is running straight."

(8) "The car is running straight on a highway."

In the case of (1), the items of information to display are diagnosis, warning, shift position, fuel level, and temperature. The allowable amount of information that can be displayed is as follows. If the display capability of the display 10 is set at 100, the amount of information can be shown to the driver or the crew is considered to be 100%. This is because while the vehicle is at a standstill, the driver can concentrate his attention upon the display 10 and therefore full display is possible. The order of priority of information is diagnosis, warning, shift, fuel and temperature. The ratio of display area is 20% for each item of information. In the case of (2), the items of information to display are back monitor, shift, fuel and temperature. The allowable amount of information is 20%. Information is limited to 20% because when traveling in reverse, the driver must confirm conditions to the rear of the vehicle and cannot watch the display closely so it is necessary to reduce the amount of information displayed. The order of priority is back monitor, shift, fuel and temperature and the ratio of display area is 60%, 20%, 10% and 10%, in that order. This ratio is based on the fact that while traveling in reverse, information about the condition at the rear of the vehicle is most important. In the case of (3), the items of information to display are route guide with the arrow mark, speed, fuel and temperature, and as the vehicle is running, the allowable amount of information is limited to 40%. The order of priority of information is route guide with arrow mark, speed, fuel and temperature and the ratio of display area is 30%, 50%, 10% and 10%, in that order. Although route guide with arrow mark has been given the highest priority, the ratio of display area for speed is largest because route guide can be given to the driver with a simple arrow mark which occupies a very small area. In the case of (4), the items of information to display, the allowable amount of information and the order of priority are the same as in (3), but the ratio of display area is different with 40%, 40%, 10% and 10%. More specifically, the display area for route guide with arrow mark is increased while the display area for speed is reduced because, as the vehicle approaches an intersection, the importance of information about the intersection increases and more information about the intersection is displayed with a greater display area. In a similar manner as described, regarding the cases of (5), (6), (7) and (8), the items of information, the allowable amount of information, the order of priority and the ratio of display area are decided and stored in memory. The information processor 16 accesses the memory 14 containing such a table as this to read the items of information corresponding to the current running condition, and displays information with a specified ratio of display area.

Figure 3:
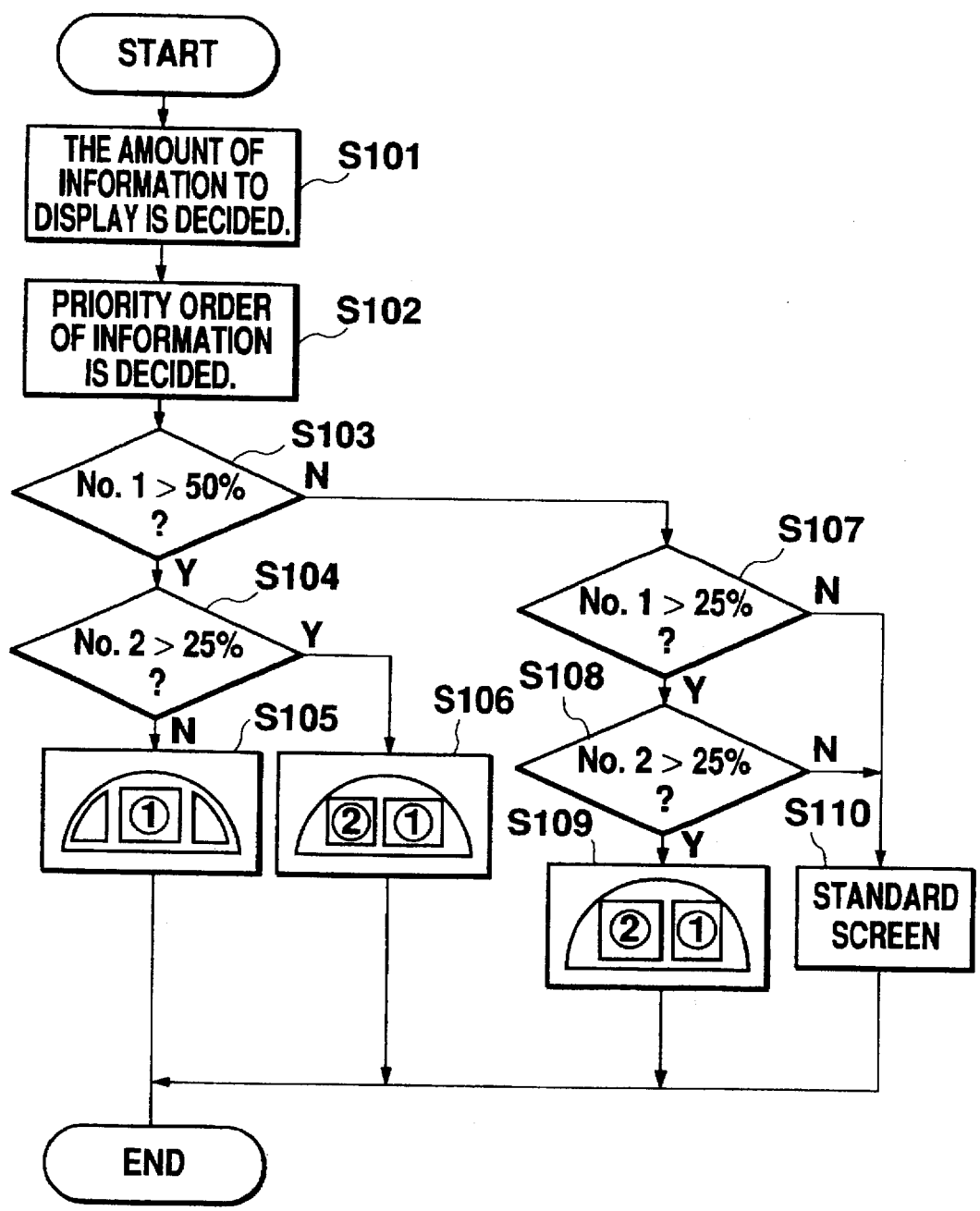
FIG. 3 is an operation flowchart of the display apparatus shown in FIG. 1.

FIG. 3 is a process flowchart of the information processor 16. The information processor 16 recognizes the current running condition using information from the navigation system 22 and the sensor system 28, and accesses the memory 14. The information processor 16 decides the amount of information to display, that is, the allowable amount of information according to the running condition (S101), and also decides the priority (the degree of importance) of the respective items of information (S102). The priority is, to be more specific, the order of priority and the ratio of display area. A decision is made whether the item of information with the highest priority has a display area ratio of greater than 50% (S103). In the case of (2), for example, since the ratio of the back monitor with the first priority is 60%, the result of the above decision is YES. In the case of (4), the ratio of the intersection guide with the first priority is 40%, the result of the decision is NO. If the ratio of an item of information with the first priority is larger than 50%, a decision is made if the ratio of the item of information with the second priority is larger than 25% (S104). If the ratio of the second-priority item is less than 25%, in other words, if the first-priority item is far more important than the other items, the first-priority item of information is displayed in a large area at the center of the display 10, and consequently the other items of information are displayed according to their ratios around the first-priority item (S105). If the second-priority item of information has an area ratio of larger than 25%, the first- and second-priority items are displayed according to their ratios on the left and the right sides of the display 10 (S106). The first-priority item should preferably be displayed on the side closer to the driver's seat.

On the other hand, if the first-priority item has an area ratio of less than 50%, a decision is made whether the area ratio of this first-priority item is larger than 25% (S107). If so, a decision is made if the second-priority item also has an area ratio of larger than 25% (S108). If the first and second priority items both have an area ratio of larger than 25%, they are displayed in a large area on the left and the right sides of the display 10 (S109). If the first and second priority items both have an area ratio of less than 25%, they are displayed according to their ratios in an ordinary picture composition (S110). Though not illustrated, when operation or accident information is supplied singly from any of the systems, the information processor 16 displays the information superimposed on the screen image.

By the process as described, the information processor 16 displays various items of information by suitably changing their display areas. Examples are shown in the following.

Figure 4:
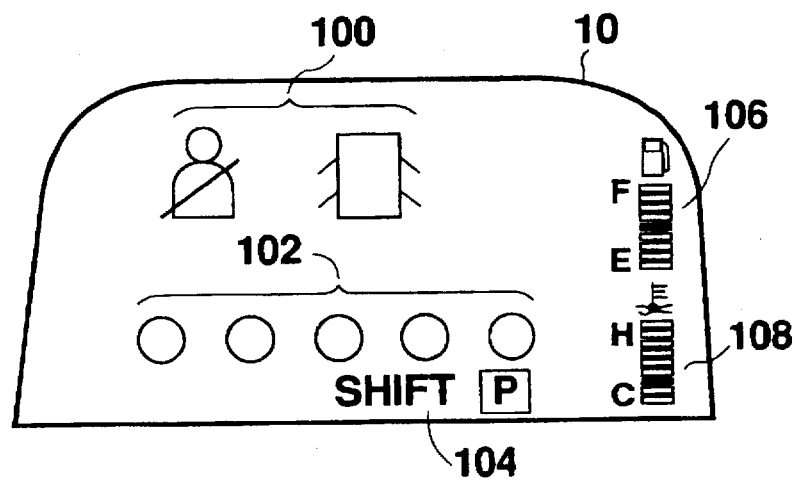
FIG. 4 is a screen image on the display when the driver enters a vehicle.

FIG. 4 shows an example of screen image of (1), that is, when the driver gets into a vehicle and puts the engine key in the starter switch. The first-priority item of diagnosis and the second-priority item of warning both have a display area of less than 25%, they are shown in almost equal display areas in an ordinary picture composition. In FIG. 4, reference numeral 100 denotes warning about the seat belt and the open/close condition of doors, 102 denotes diagnosis, 104 denotes shift position, 106 denotes fuel and 108 denotes temperature.

Figure 5:
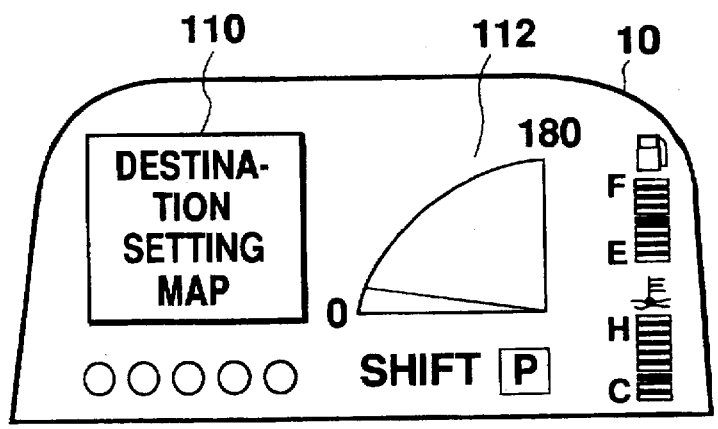
FIG. 5 is a screen image on the display when a destination is set.

FIG. 5 shows a case where the driver stops the car and sets a destination. The screen shows a destination setting map 110 and a speedometer 112 in place of warning 102. The destination setting map 110 is supplied from the navigation system 22. The display area ratios of the destination setting map and the speedometer are respectively set to be more than 25%, and are displayed on the left and the right sides on the display 10.

Figure 6:
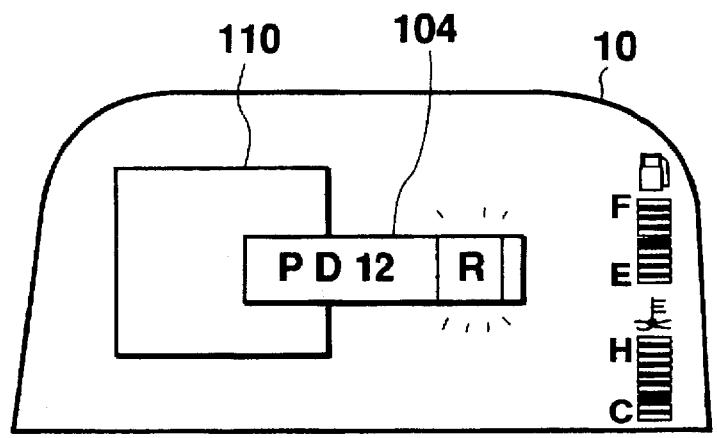
FIG. 6 is a screen image on the display when the shift position is set in reverse (R)

FIG. 6 shows a case where the shift lever is shifted from the P (parking) position to the R (reverse) position. In this case, when receiving information from the sensor system 28 that the shift lever has been moved from P to R, the information processor 16 displays the shift position information 104 superimposed at the center of the display 10. From this, the driver can easily recognize that the shift lever has been shifted to the R position.

Figure 7:
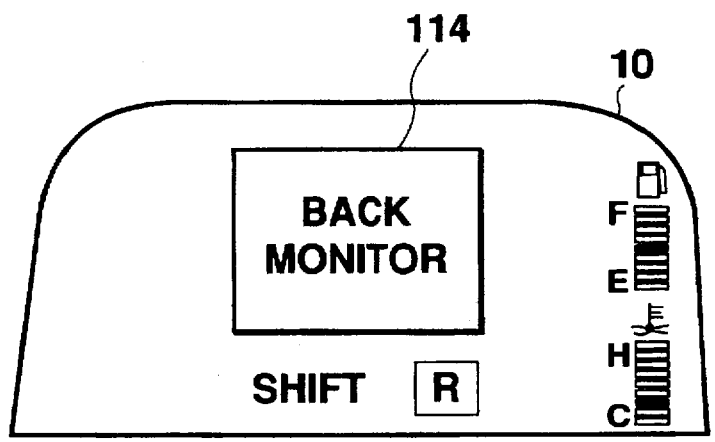
FIG. 7 is a screen image on the display after the shift position is set in R.

FIG. 7 shows the condition that the shift lever has been set at the R position, namely, case (2). The back monitor image 114 as the first-priority information, that is, the image of the scene to the rear of the vehicle supplied from the monitor system 26 is displayed in a large area at the center of the display 10. Therefore, from this image, the driver can easily grasp the condition to the rear of the vehicle, making it possible for him to smoothly back up.

Figure 8:
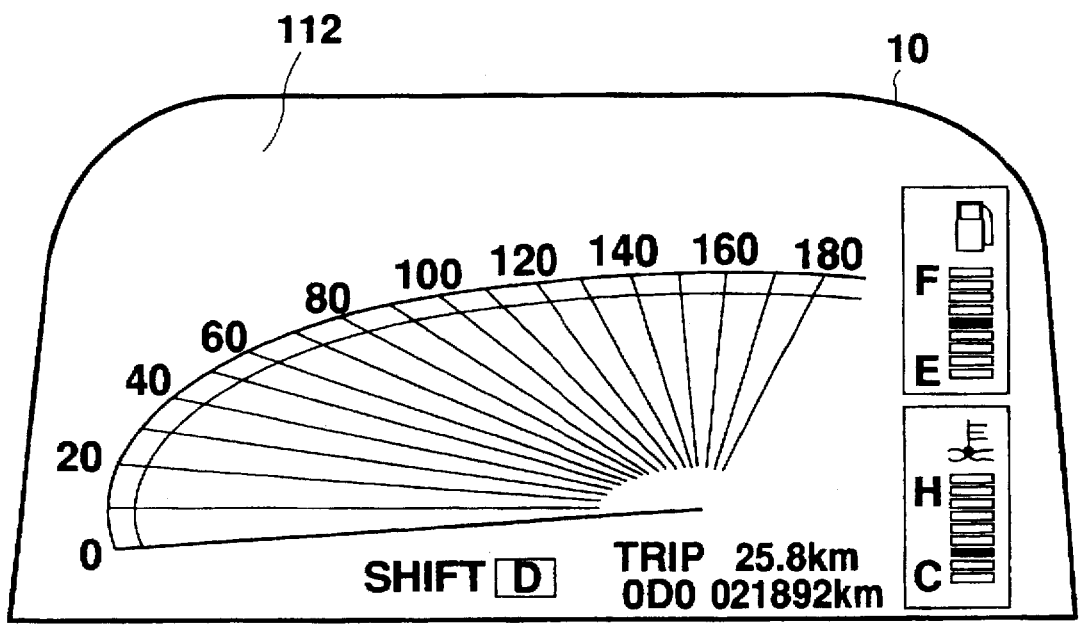
FIG. 8 is a screen image on the display after the shift position is set in D (drive)

FIG. 8 shows a case where the driver puts the shift lever in the D (drive) position and is preparing to drive. The speedometer 112 is shown in a large area at the center of the display 10. Note that the speed scale is graduated in 20 km/h intervals up to 180 km/h.

Figure 9:
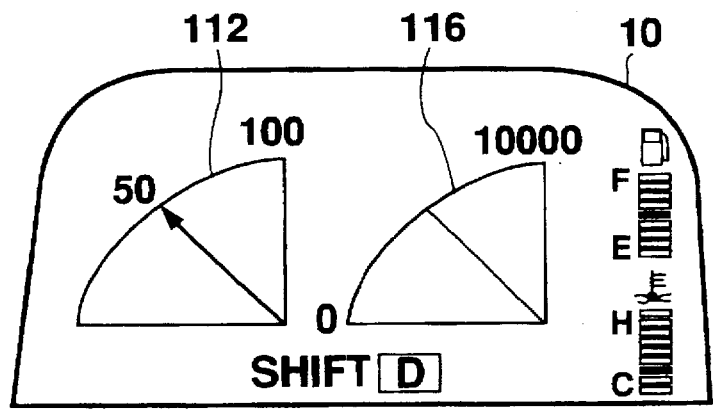
FIG. 9 is a screen image on the display when the vehicle is running on a general automobile road (without route guide)

FIG. 9 shows a case where the car has begun motion with the shift lever put in the D position. As the accelerator pedal is depressed, the engine rotating speed increases, so that the tachometer 116 is shown in almost the same display area as the speedometer 112. If a decision is made from information from the navigation system that the vehicle is running on a general automobile road, the speedometer scale is changed to a maximum of 100 km/h and the region up to the speed limit of 50 km/h appears in blue.

Figure 10A:
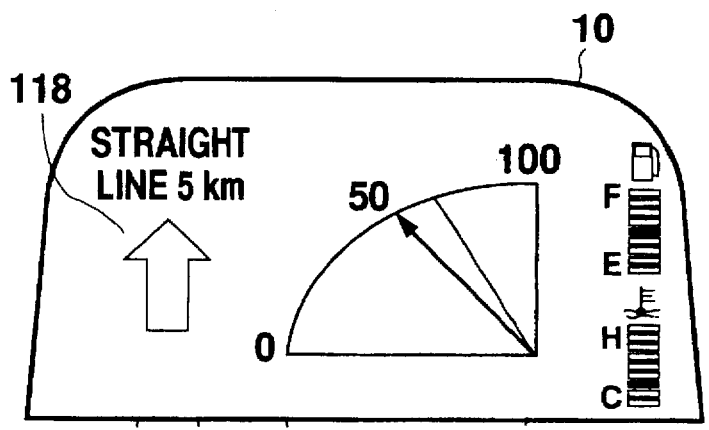
FIG. 10A is a screen image on the display when running straight while following a route guide.
Figure 10B:
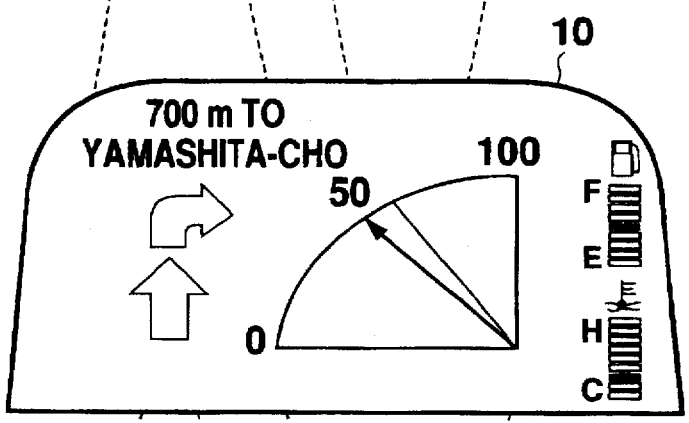
FIG. 10B is a screen image on the display when running at a point 700 m before an intersection while following a route guide.
Figure 10C:
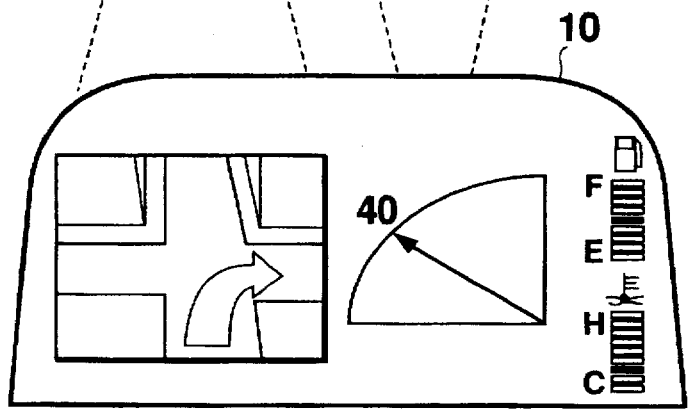
FIG. 10C is a screen image on the display when running at a point 300 m before an intersection while following a route guide.

FIG. 10 shows an example of display when the vehicle is running while following the route guide. FIG. 10A shows a display screen while running straight, in which the arrow mark 118 is shown on the left and the speedometer is shown on the right side of the display screen 10. The display area ratio of the arrow mark to the speedometer is 30% to 50%. Route guide information "straight line 5 km" from the navigation system 22 is shown above the arrow mark. FIG. 10B shows a display screen when the vehicle is 700 m before an intersection, in which the arrow guide and the speedometer are shown like in FIG. 10A, but the area ratio is 40% to 40%. More specifically, the area of the arrow guide is increased, while the area of the speedometer is decreased. The broken lines show the changes of the display areas. Above the arrow guide, there is a guide message "700 m to Yamashita-cho". In addition, there is a turn-right arrow guide to indicate that the vehicle should turn to the right at the intersection. FIG. 10C shows a display screen when the vehicle is 300 m before an intersection, in which the items of information are the arrow guide and the speedometer as in the above two display images, but the display area ratio is 50% to 30%. In other words, the area of the arrow guide is further increased, while the area of the speedometer is further decreased. (The broken lines show how the areas change.) As the display area of the speedometer decreases, the amount of information is changed to show only the current speed (40 km/h). On the other hand, the arrow guide changes to a three-dimensional image display to give a stereoscopic representation of the condition near the intersection. Note that three-dimensional image data is supplied from the navigation system. As described, while the same items of information are displayed, the display areas and the amounts of information are varied sequentially according to running conditions, in other word, the display screen changes according to running conditions to enable the driver to easily see and understand the display screen and obtain needed information. In FIG. 10, the mode of supply of information was changed at 700 m and 300 m before the intersection, but it is also possible to successively change the display areas at every 100 m, for example.

Figure 11:
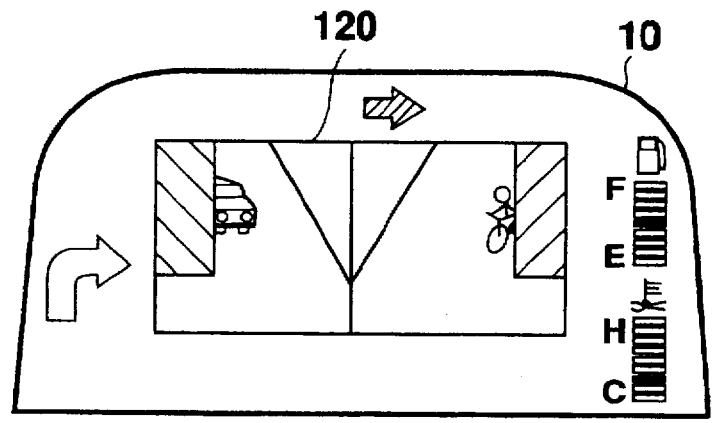
FIG. 11 is a screen image on the display at an intersection where the driver cannot get a clear view ahead.

FIG. 11 shows a display screen when the vehicle is passing an intersection where it is difficult to see far ahead. The information processor 16, which detects through navigation system data that the vehicle has come to such an intersection, displays the left and right images 120 from the corner monitors of the monitor system 26 on the display screen 10. Since the display area ratio of corner monitor is 60%, the corner monitor information is shown in a large proportion on the display screen 10. In FIG. 11, the right-side image shows a bicycle coming from the right side of the intersection, while the left-side image shows a car coming from the left side of the intersection. The arrow mark at the upper portion of the screen is what is called the turn indicator light to indicate that this vehicle is going to turn to the right.

Figure 12:
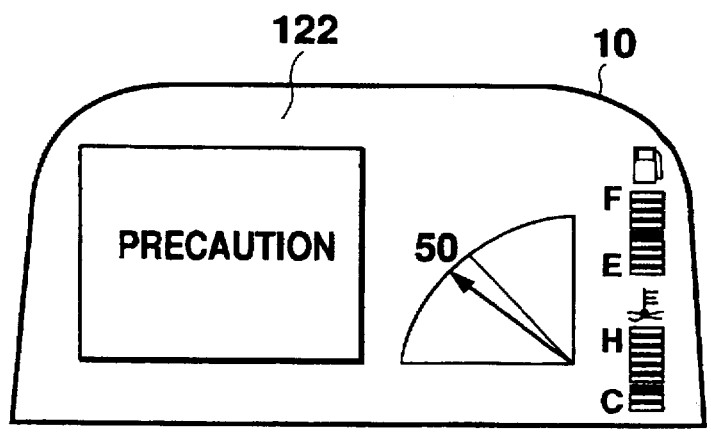
FIG. 12 is a screen image on the display when a warning message is received from a traffic information communication system.

FIG. 12 shows a display screen which appears when the traffic information communication system 24, on receiving data from a beacon along the road that there is a pedestrian about to cross at a pedestrian crossing ahead, supplies the data to the information processor 16. In this case, in place of the arrow guide, a precaution image 122 for "precaution" for a pedestrian about to cross the road appears on the display screen 10 to alert the driver.

Figure 13:
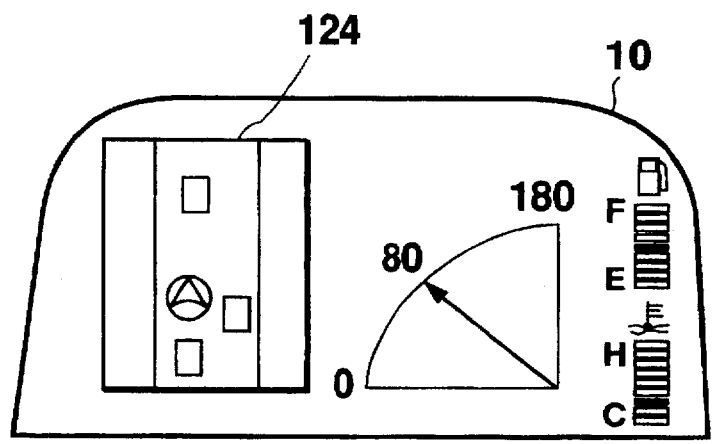
FIG. 13 is a screen image on the display when running straight on a highway.

FIG. 13 shows a display screen when the vehicle is running straight on a highway. The displayed items of information are ambient condition of the vehicle, speedometer, fuel and temperature. The ambient condition of the vehicle is produced by the information processor 16 based on data that the traffic information communication system 24 obtains from transmitters along the road, and is displayed as a bird's eye view taken from above the road. The arrow mark in the screen indicates the position of this vehicle. The scale of the speedometer is changed from a maximum of 100 km/h on a general automobile road to a maximum of 180 km/h on a highway. The fact that the vehicle has moved to the highway is detected by data from the navigation system 22.

Figure 14:
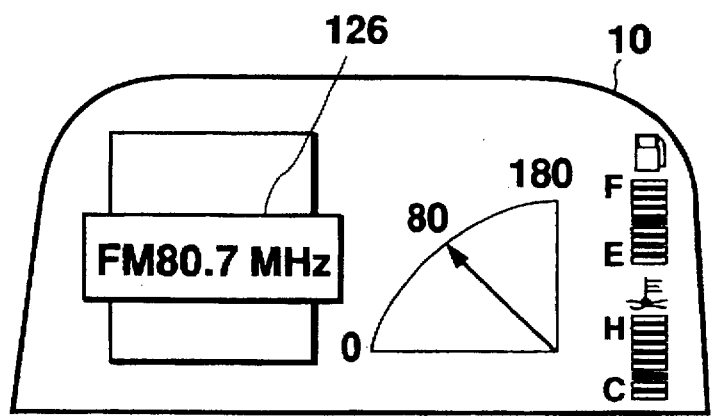
FIG. 14 is a screen image on the display when operating the radio tuner while traveling on a highway.

FIG. 14 shows a display screen when the audio tuner is operated while the vehicle is running on a highway. The information processor 16, on receiving data from the sensor system 28, displays an audio tuner operation image 126 superimposed on the display screen 10.

Figure 15:
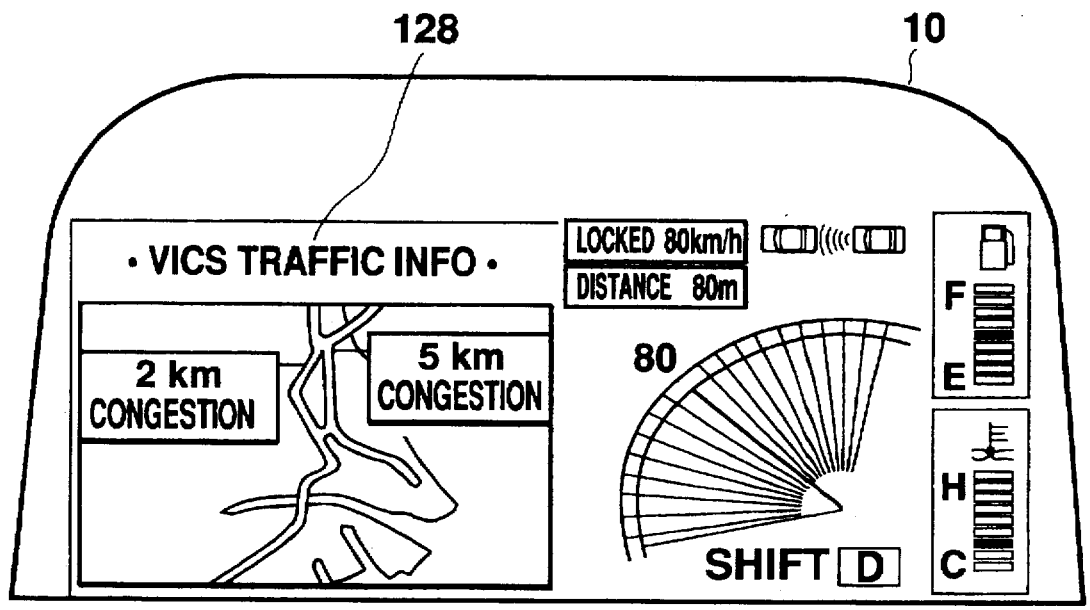
FIG. 15 is a screen image on the display when traffic information is received from a traffic information communication system.

FIG. 15 shows a display screen when traffic information is received from the information center along the road while running on a highway following the vehicle ahead. Traffic information (congestion information, for example) that the traffic information communication system 24 received is supplied to the information processor 16, which displays the traffic information image in the left-half portion of the display screen 10. FIG. 15 shows that congestion is occurring for lengths of 2 km and 5 km at respective points on the map. Note that the indication at the upper position of the speedometer image shows that this vehicle is following the vehicle ahead at a speed of 80 km/h.

Figure 16:
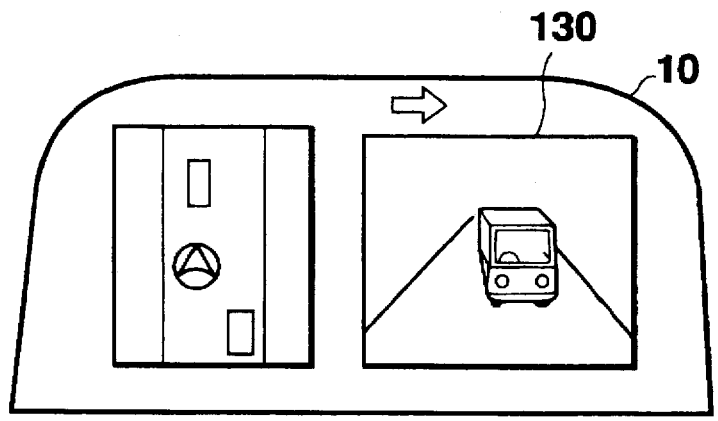
FIG. 16 is a screen image on the display when changing a lanes while traveling on a highway.

FIG. 16 shows a display screen when this vehicle is moving to the right lane. When the driver indicates his intention to change lanes by the turn indicator light, the information processor 16 displays on the screen an image 130 from the rear-right sensor of the sensor system 28 in place of the speedometer. By this, the driver can change lanes smoothly. When the driver operates the left turn indicator light, the image from the rear-left sensor appears on the screen.

Figure 17:
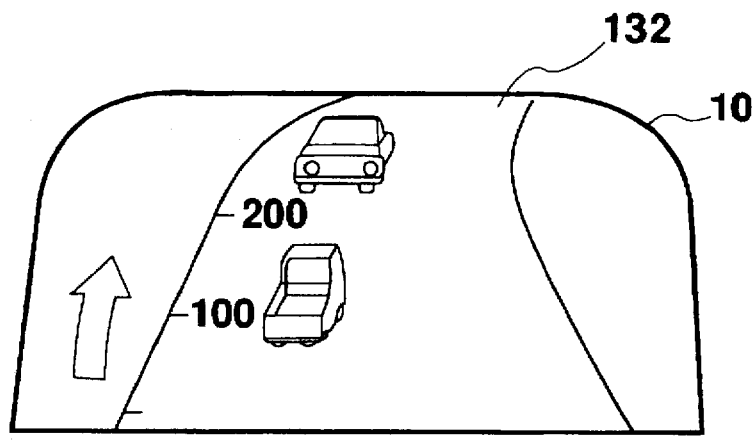
FIG. 17 is a screen image on the display while running in a dense fog.

FIG. 17 shows a display screen when a dense fog occurs while traveling. When the sensor system 28 detects a dense fog, the information processor 16 drives an infrared camera (not shown) installed at the front of the vehicle to view the scene in front, and displays the scene on the display screen 10. In this case, since the image of the speedometer is not important, the image 132 can be displayed in an area ratio of 100%. In FIG. 17, the distance between this vehicle and the vehicle ahead measured by an infrared laser or the like is displayed at the same time.

Figure 18:
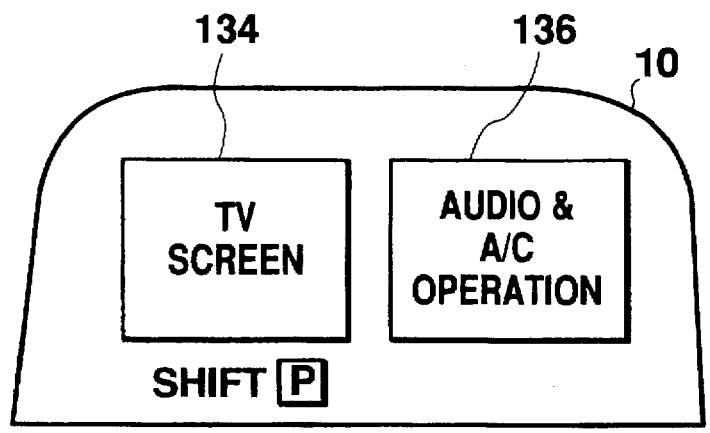
FIG. 18 is a screen image on the display when the ACC switch is turned on while the vehicle is at a standstill.

FIG. 18 shows a display screen when the shift lever is set in the P position and the ignition switch is rotated until the ACC switch turns on while the vehicle is not in motion. The TV screen 134 and the Audio and A/C (audio and air conditioner) operation image 136 are displayed in ratios of 50% each.

Figure 19:
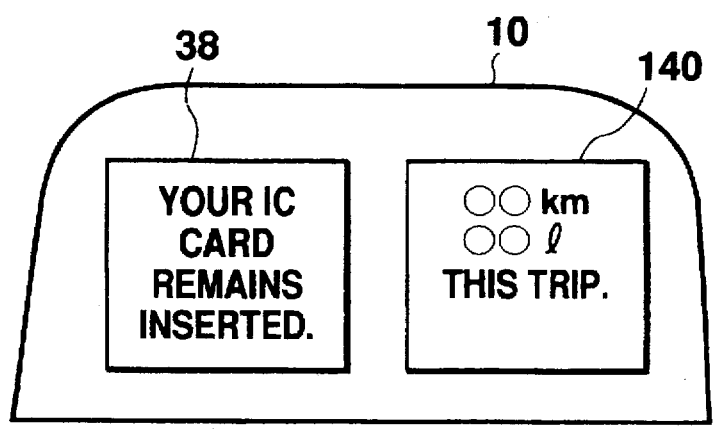
FIG. 19 is a screen image on the display when the ignition key is removed.

FIG. 19 shows a display screen when the driver removes the key and exits the vehicle. If an IC card used for auto-charging remains inserted in the specified slot, the information processor 16 displays a message to that effect. The trip image of total running distance in the trip, fuel consumption, etc. is also shown.

In this embodiment of the present invention, various items of information are shown corresponding to the running condition on the display screen as necessity requires. The display areas and the displayed amounts of information are varied according to the condition, so that desired information can be supplied readily and securely to the driver.

In this embodiment, some examples of display screens corresponding to some running conditions are shown, but those display images can obviously be varied for other running conditions. For example, when an emergency switch is operated, an emergency menu (for example, hospitals, police stations, car repair service stations, etc.,) may be displayed or the vehicle trouble location may be shown. The position of the vehicle relative to garage may be used. In meter indications, messages may be shown in large characters or in various languages.

The degree of information importance may be changed optionally or automatically according to the driver's driving characteristics. For example, if the driver often makes mistakes in shift lever operation, the degree of importance of shift information may be raised in the priority ranking.

As has been described, according to the present invention, in contrast to the fixed indications on the conventional instrument panel, various items of information corresponding to the running conditions are displayed by suitably varying the display areas or the amounts of information displayed. Therefore, the driver can readily and securely obtain information necessary for the current condition and thereby drive comfortably and smoothly.

What is claimed is:

1. An information display apparatus for a vehicle comprising:

detection means for detecting running conditions of said vehicle, said detection means detecting at least a straight running condition, a reverse running condition and a running condition before an intersection;

memory means for storing information to display corresponding to running conditions detected and a degree of importance corresponding to said information stored;

display means for displaying information; and control means for reading display information corresponding to a detected running condition and a degree of importance related to said display information stored in said memory means, and for controlling said display means to display said display information in a display area according to said degree of importance corresponding to said display information, wherein said control means controls said display means to display speed information in a larger proportion than other items of information when said vehicle is running straight, information about the condition behind said vehicle in a larger proportion than other items of information when said vehicle is going in reverse, and information for intersection guide in a larger proportion than other items of information when said vehicle is approaching an intersection.

2. An information display apparatus for a vehicle comprising:

detection means for detecting a running condition;

memory means for storing items of information to display corresponding to said running condition detected and degrees of importance corresponding to said items of information stored;

display means for displaying information;

control means for reading an item of display information corresponding to said detected running condition and a degree of importance related to said item of display information stored in said memory means, and for controlling said display means to display an amount of said display information according to said degree of importance corresponding to said item of display, wherein said control means controls said display means to display a larger amount of speed information than other information when the vehicle is running straight, a larger amount of information about conditions behind the vehicle than other information when the vehicle is going in reverse, and a larger amount of intersection guide than other information when the vehicle is approaching an intersection.

3. An information display apparatus for a vehicle comprising:

a detector for detecting running conditions of said vehicle, said detector detecting at least a straight running condition, a reverse running condition and a running condition before an intersection;

a storage device for storing information to display corresponding to running conditions detected and a degree of importance corresponding to said information stored;

a display for displaying information; and a controller for reading display information corresponding to a detected running condition and a degree of importance related to said display information stored in said storage device, and for controlling said display to display said display information in a display area according to said degree of importance corresponding to said display information, wherein said controller controls said display to display speed information in a larger proportion than other items of information when said vehicle is running straight, information about the condition behind said vehicle in a larger proportion than other items of information when said vehicle is going in reverse, and information for intersection guide in a larger proportion than other items of information when said vehicle is approaching an intersection.

4. An information display apparatus for a vehicle comprising:

a detector for detecting a running condition;

a storage device for storing items of information to display corresponding to said running condition detected and degrees of importance corresponding to said items of information stored;

a display for displaying information;

a controller for reading an item of display information corresponding to said detected running condition and a degree of importance related to said item of display information stored in said storage device, and for controlling said display to display an amount of said display information according to said degree of importance corresponding to said item of display, wherein said controller controls said display to display a larger amount of speed information than other information when the vehicle is running straight, a larger amount of information about conditions behind the vehicle than other information when the vehicle is going in reverse, and a larger amount of intersection guide than other information when the vehicle is approaching an intersection.

5. An information display apparatus for a vehicle comprising:

detection means for detecting a running condition;

memory means for storing display information corresponding to respective running conditions and degrees of importance corresponding to said information;

display means for displaying information; and control means for reading display information corresponding to a detected running condition and a degree of importance corresponding to said display information from said memory means, and for controlling said display means to display said display information in a display area according to the degree of importance corresponding to said display information, wherein said detection means detects at least a straight running condition of said vehicle, and wherein said control means controls said display means to display speed information in a larger portion than other items of display information when said vehicle is moving straight.

6. An information display apparatus for vehicles comprising:

detection means for detecting a running condition;

memory means for storing information to display corresponding to respective running conditions and degrees of importance corresponding to said information;

display means for displaying information; and control means for reading display information corresponding to a detected running condition and a degree of importance of said display information from said memory means, and for controlling said display means to display said display information in a display area according to the degree of importance corresponding said display information, wherein said detection means detects at least a reverse running condition of said vehicle, and wherein said control means controls said display means to display information concerning a condition behind said vehicle in a larger portion than other items of information when said vehicle is moving in reverse.

7. An information display apparatus for a vehicle comprising:

detection means for detecting a running condition;

memory means for storing display information corresponding to respective running conditions and degrees of importance corresponding to said information;

display means for displaying information; and control means for reading display information corresponding to a detected running condition and a degree of importance corresponding to said display information from said memory means, and for controlling said display means to display said display information in a display area according to the degree of importance corresponding to said display information, wherein said detection means detects at least a running condition of said vehicle before an intersection, and wherein said control means controls said display means to display information for intersection guidance in a larger portion than other items of display information when said vehicle is moving straight.

8. An information display apparatus for a vehicle comprising:

detection means for detecting a running condition;

memory means for storing items of information to display corresponding to running conditions detected and degrees of importance of said items of information stored;

display means for displaying information; and control means for reading an item of display information corresponding to said detected running condition and a degree of importance related to said display information stored in said memory means, and for controlling said display means to display said display information in a display area according to the degree of importance corresponding to said display information, wherein said detection means detects at least a straight running condition of said vehicle, and wherein said control means controls said display means to display speed information in a larger portion than other items of information when said vehicle is moving straight.

9. An information display apparatus for a vehicle comprising:

detection means for detecting a running condition;

memory means for storing items of information to display corresponding to running conditions detected and degrees of importance of said items of information stored;

display means for displaying information; and control means for reading an item of display information corresponding to said detected running condition and a degree of importance related to said display information stored in said memory means, and for controlling said display means to display said display information in a display area according to the degree of importance corresponding to said display information, wherein said detection means detects at least a reverse running condition of said vehicle, and wherein said control means controls said display means to display information concerning a condition behind said vehicle in a larger portion than other items of information when said vehicle is moving in reverse.

10. An information display apparatus for a vehicle comprising:

detection means for detecting a running condition;

memory means for storing items of information to display corresponding to running conditions detected and degrees of importance of said items of information stored;

display means for displaying information; and control means for reading an item of display information corresponding to said detected running condition and a degree of importance related to said display information stored in said memory means, and for controlling said display means to display said display information in a display area according to the degree of importance of said information, wherein said detection means detects at least a running condition of said vehicle before an intersection, and wherein said control means controls said display means to display information for intersection guidance in a larger portion than other items of information when said vehicle is moving straight.

11. An information display apparatus for a vehicle comprising:

a detector for detecting a running condition;

a storage device for storing display information corresponding to respective running conditions and degrees of importance corresponding to said information;

a display for displaying information; and a controller for reading display information corresponding to a detected running condition and a degree of importance corresponding to said display information from said storage device, and for controlling said display to display said display information in a display area according to the degree of importance corresponding to said display information, wherein said detector detects at least a straight running condition of said vehicle, and wherein said controller controls said display to display speed information in a larger portion than other items of display information when said vehicle is moving straight.

12. An information display apparatus for vehicles comprising:

a detector for detecting a running condition;

a storage device for storing information to display corresponding to respective running conditions and degrees of importance corresponding to said information;

a display for displaying information; and a controller for reading display information corresponding to a detected running condition and a degree of importance of said display information from said storage device, and for controlling said display to display said display information in a display area according to the degree of importance corresponding said display information, wherein said detector detects at least a reverse running condition of said vehicle, and wherein said controller controls said display to display information concerning a condition behind said vehicle in a larger portion than other items of information when said vehicle is moving in reverse.

13. An information display apparatus for a vehicle comprising:

a detector for detecting a running condition;

a storage device for storing display information corresponding to respective running conditions and degrees of importance corresponding to said information;

a display for displaying information; and a controller for reading display information corresponding to a detected running condition and a degree of importance corresponding to said display information from said storage device, and for controlling said display to display said display information in a display area according to the degree of importance corresponding to said display information, wherein said detector detects at least a running condition of said vehicle before an intersection, and wherein said controller controls said display to display information for intersection guidance in a larger portion than other items of display information when said vehicle is moving straight.

14. An information display apparatus for a vehicle comprising:

a detector for detecting a running condition;

a storage device for storing items of information to display corresponding to running conditions detected and degrees of importance of said items of information stored;

a display for displaying information; and a controller for reading an item of display information corresponding to said detected running condition and a degree of importance related to said display information stored in said storage device, and for controlling said display to display said display information in a display area according to the degree of importance corresponding to said display information, wherein said detector detects at least a straight running condition of said vehicle, and wherein said controller controls said display to display speed information in a larger portion than other items of information when said vehicle is moving straight.

15. An information display apparatus for a vehicle comprising:

a detector for detecting a running condition;

a storage device for storing items of information to display corresponding to running conditions detected and degrees of importance of said items of information stored;

a display for displaying information; and a controller for reading an item of display information corresponding to said detected running condition and a degree of importance related to said display information stored in said storage device, and for controlling said display to display said display information in a display area according to the degree of importance corresponding to said display information, wherein said detector detects at least a reverse running condition of said vehicle, and wherein said controller controls said display to display information concerning a condition behind said vehicle in a larger portion than other items of information when said vehicle is moving in reverse.

16. An information display apparatus for a vehicle comprising:

a detector for detecting a running condition;

a storage device for storing items of information to display corresponding to running conditions detected and degrees of importance of said items of information stored;

a display for displaying information; and a controller for reading an item of display information corresponding to said detected running condition and a degree of importance related to said display information stored in said storage device, and for controlling said display to display said display information in a display area according to the degree of importance of said information, wherein said detector detects at least a running condition of said vehicle before an intersection, and wherein said controller controls said display to display information for intersection guidance in a larger portion than other items of information when said vehicle is moving straight.

* * * * *